Figure 1:
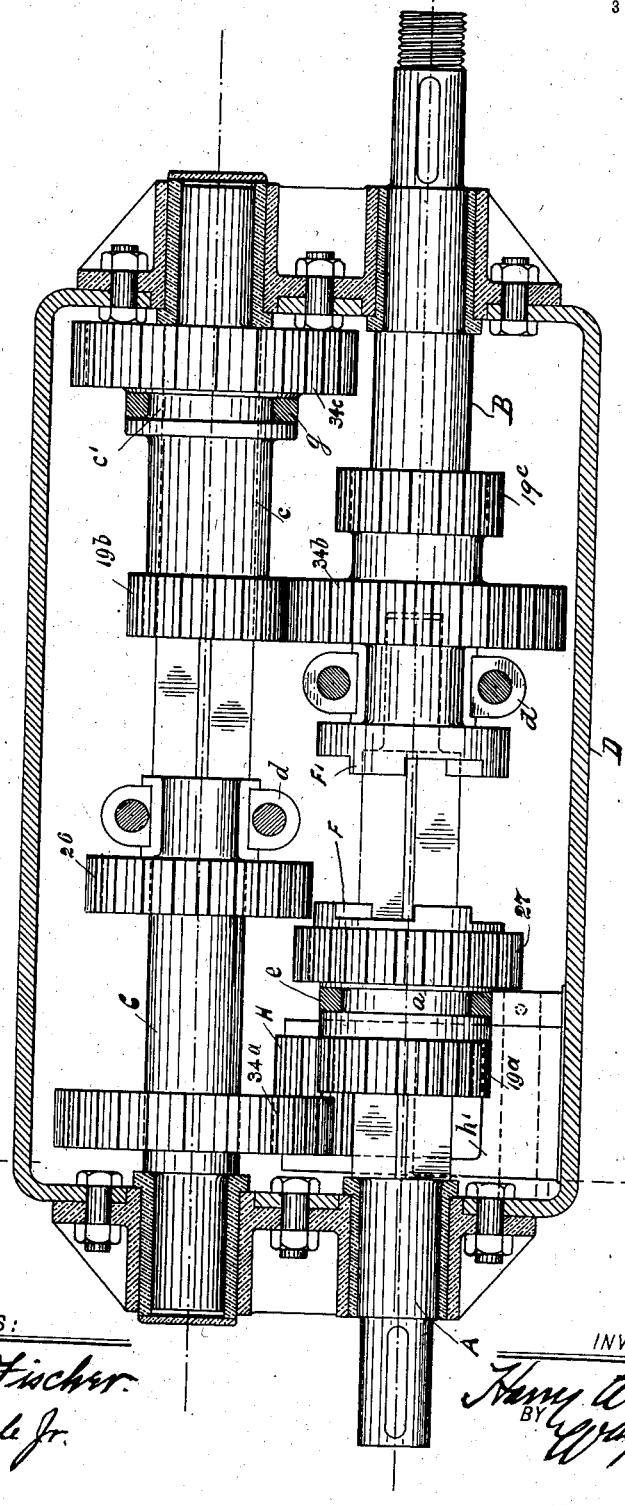

No. 827,454. PATENTED JULY 31, 1906.
H. W. LEONARD.
VARIABLE SPEED AND REVERSING GEAR.
APPLICATION FILED OCT. 7, 1902.

3 SHEETS—SHEET 1.

WITNESSES:

INVENTOR

No. 827,454. PATENTED JULY 31, 1906.
H. W. LEONARD.
VARIABLE SPEED AND REVERSING GEAR.
APPLICATION FILED OCT. 7, 1902.

3 SHEETS—SHEET 2.

WITNESSES:

INVENTOR

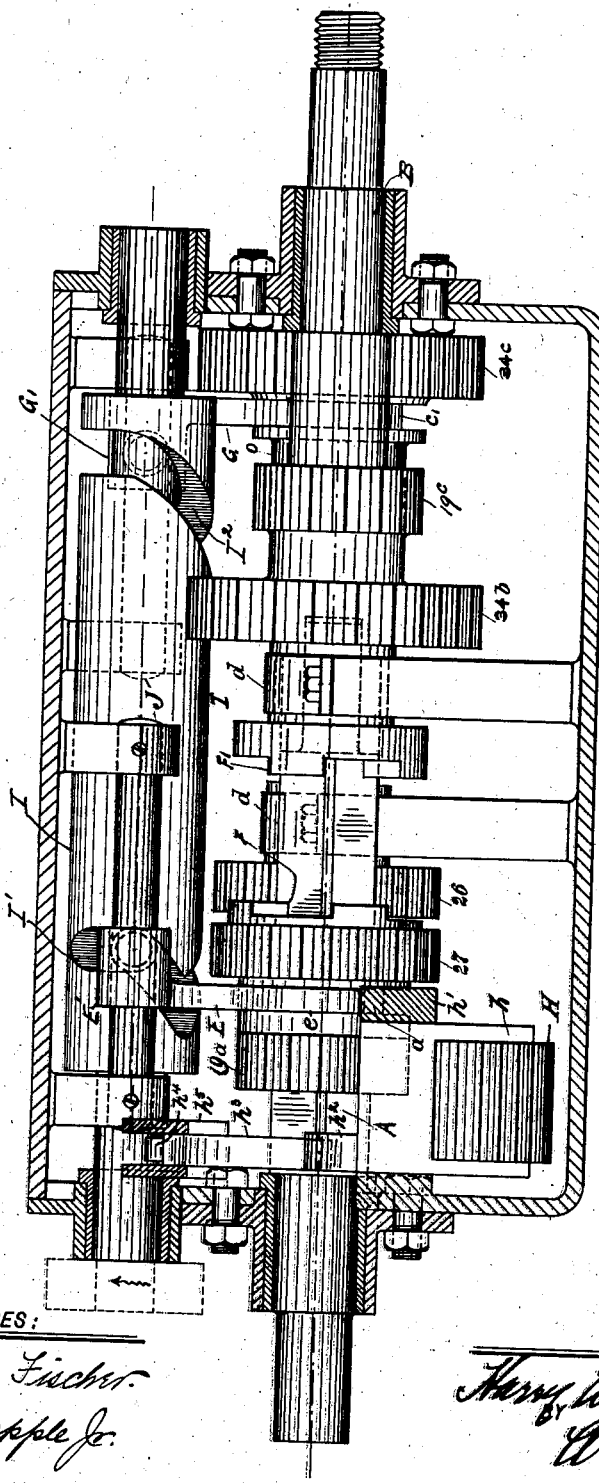

UNITED STATES PATENT OFFICE.

HARRY WARD LEONARD, OF BRONXVILLE, NEW YORK.

VARIABLE-SPEED AND REVERSING GEAR.

No. 827,454.  Specification of Letters Patent.  Patented July 31, 1906.

Application filed October 7, 1902. Serial No. 126,367.

*To all whom it may concern:*

Be it known that I, HARRY WARD LEONARD, a citizen of the United States, residing at Bronxville, in the county of Westchester and State of New York, have invented a certain new and useful Improvement in Variable-Speed and Reversing Gears, of which the following is a specification.

It is well known to those skilled in the art that a motor-car having a gasolene-motor for its motive power requires a variable-speed gear to get good results on various grades. It is important that the variable-speed gear should be in use as little as possible on account of the loss of power, noise, depreciation, the objection to frequent shifting of the gears, &c. Variable-speed gears as now in use have two and sometimes three different speeds, and some are so arranged that when the vehicle is operated at its highest speed the change-gear is not in use—that is to say, there is provided a direct driving connection from the engine-shaft to the driven shaft, a clutch being provided to make and break this connection in operating the gear; but the former gears having a direct drive for one speed and having several other speeds have occupied a great deal of space and have been expensive and unsatisfactory in operation.

It has been found in practice that in touring with a three-speed gear the high-speed connection is in use the greater part of the time; but on account of the high speed usually desired for the maximum speed, with consequent corresponding reduction of torque, this necessitates frequent shifting of the driving connection in ascending and descending the various grades met with on most roads. Motor-car operators are always inclined to run as much as possible on the direct driving connection, because of the smoother running of the car under such conditions, and it will be readily understood that when the direct driving connection is employed for the highest speed it will be necessary to frequently change to the next lower speed to ascend most hills. The condition and grades of roads traveled over in touring are such that the third speed of my four-speed gear will be as fast as the car can be driven, because the roads are rarely favorable for high speeds and legal restrictions as to speed also frequently make the fourth speed prohibitive. The first and second speeds will be rarely employed in ordinary touring, because as a general rule the third speed will be sufficient to overcome the hills ordinarily met with, and especially since the momentum of the car will enable it to mount short hills of even ten to twelve per cent. grades. It occasionally happens that a good stretch of road is met with, and at such times I have found it desirable to have an additional higher-speed connection.

One object of my invention is to procure several graduated forward speeds and a reversed speed, so arranged that the operator can obtain by simple manipulating means the necessary different speeds required in practice, while securing a simple, reliable, and compact form of variable gear. This will be clearly understood from the following description and accompanying drawings.

Another object of my invention is to provide a gear in which the direct driving connection will for usual cases as regard weight of car, power, and roads not be on the highest speed of the gear, but preferably on the third speed, and when the direct drive is on an intermediate speed to provide an additional higher-speed connection which will be used under exceptionally good conditions. The carrying out of this idea requires a novel arrangement of gear-wheels and pinions and the shifting mechanism for placing them into and out of mesh, and I also provide a simple form of reversing-gear.

In a modern touring-car provided with a fifteen-horse-power motor and a four-speed gear the highest speed is about forty miles per hour. In my variable-speed gear I arrange the fourth or high speed gear so as to give the highest possible speed on a nearly level road; but under such connections the motor will not drive the vehicle up more than perhaps a two or three per cent. grade if the vehicle, with its load, weighs, say, twenty-five hundred pounds. The third speed on the direct driving connection as I arrange it is about twenty-four miles per hour. With the motor operating at its maximum speed and with this connection the vehicle can be driven up a continuous grade of about five per cent. The second speed is about fourteen miles per hour and will drive the car up a grade of about eight per cent., and the first or lowest speed will be about eight miles per hour and will drive the car up a twenty-per-cent. grade. With this arrangement of the gearing a much higher general efficiency is obtained and the minimum shifting of the change-gear, with consequent advantage that the operator can direct his entire attention to steering, &c. Other advantages are freedom from noise and reduction of wear and freedom from shock to the mechanism in ordinary touring, while still permitting a still higher speed on the fourth gear when exceptional opportunities for increased speed present themselves.

In traveling one hundred miles over ordinary roads with a motor-car provided with my improved variable-speed gear I avoid the use of any gears in the change-gear box for probably ninety-eight miles out of the hundred, and it will thus be seen that the wear and noise of the gears will be greatly reduced and the frequent shifting of the gears, with objectionable consequences, as heretofore necessary, will be avoided.

My preferred form of four-speed gear having direct drive on the third speed is an advantageous one for a car used considerably in crowded city streets, as the torque of the third speed will be sufficiently high for the necessary acceleration of the car after it is slowed down on account of traffic obstructions and the speed obtainable from the direct drive will be sufficiently high for satisfactory service in city streets. Hence under such conditions the opening of the clutch and shifting of the gear and application of the brakes are materially reduced by the use of my invention. Of course in a racing-car or any other car in which the power is high relatively to the weight or the habitual use of the car is over roads having a road-surface or grades sufficiently favorable to habitually operate the car on the highest gear it will then be desirable to have the direct drive for the highest gear, and this can be accomplished by various modifications of my invention. It will also be understood that I am not limited in the scope of my invention except as expressed in the appended claims.

The various novel features of my invention will be understood from the following description and will be more particularly set forth in the appended claims.

My invention is illustrated in the accompanying drawings, in which—

Figure 2:
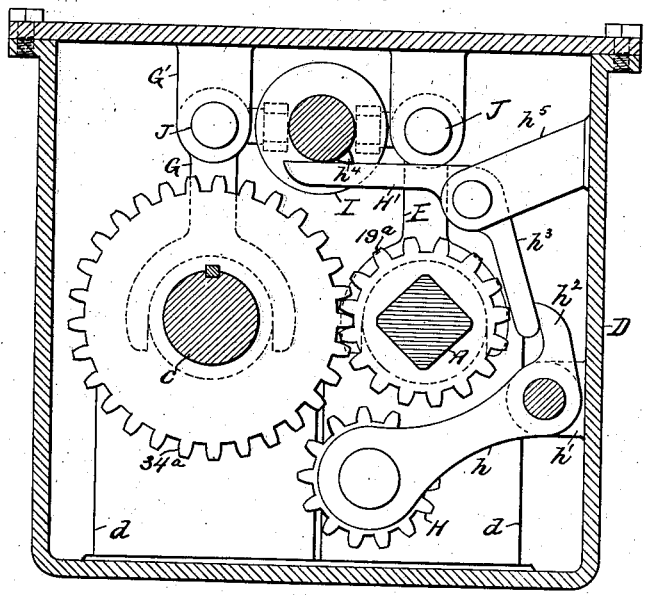
Figure 4:
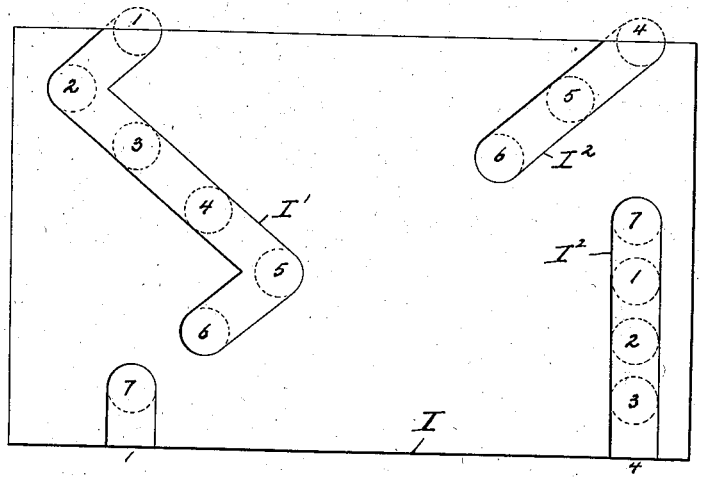

Figure 1 is a plan view of the gearing with the casing shown in horizontal section and the shifting mechanism removed; Fig. 2, a vertical cross-section on the line 2 2 of Fig. 1; Fig. 3, an elevation of the entire mechanism, the casing shown in section; Fig. 4, a diagram of the cam-surfaces of the cam-shaft.

Referring to the drawings, A, B, and C are three shafts journaled in suitable bearings secured in the end walls of the gear-case D and in intermediate bearings $d$, mounted on posts projecting from the bottom of the casing. Shaft A is of rectangular or other equivalent shape in cross-section inside the casing and has mounted thereon a pinion $19^a$ and gear-wheel 27, which are either secured together or formed in one piece. As shown, these two gears are integral and the hub is provided with a groove $a$, with which the fork $e$ of shifting-arm E engages to shift said gears along shaft A. This gear member is also provided with clutch-jaws F, adapted to engage clutch-jaws F' on the inner end of shaft B. As shown, the clutch-head which forms the inner end of shaft B has a cylindrical bore to receive the reduced cylindrical inner end of shaft A, as shown in dotted lines, said head thus forming a bearing for shaft A. Shaft B in addition to being provided with clutch members F' has keyed thereon or formed integrally therewith gear-wheel $34^b$ and pinion $19^c$. No longitudinal movement is imparted to this shaft or the clutch and gear members carried thereby. Shaft C at the left-hand end has keyed thereon gear-wheel $34^a$ and pinion 26, the former being adapted to mesh with pinion $19^a$ and the latter with gear-wheel 27. The right-hand end of shaft C, which is of rectangular or other equivalent shape in cross-section, carries sleeve $c$, having keyed thereon or formed integrally therewith pinion $19^b$ and gear-wheel $34^c$. This sleeve is also provided with a flange forming a groove $c'$, with which engages the fork $g$ of a shifting-arm G to shift said gears $19^b$ and $34^c$ horizontally and place them into and out of mesh with gear-wheel $34^b$ and pinion $19^c$.

The reversing-gear is a long pinion H, journaled in a frame $h$, which is pivoted in bearings $h'$, formed in the end and side walls of the casing. This pinion is adapted to mesh with gears $19^a$ and $34^a$ when gears $19^a$ and 27 occupy a position intermediate the gears $34^a$ and 26. Pinion H is normally out of mesh, and arm $h^2$ is adapted to be engaged by arm $h^3$ of lever H' to throw the pinion into mesh with said gears $19^a$ and $34^a$. This lever is pivoted between the arms of a bifurcated stud $h^5$, projecting from the side wall of the casing. Lever H' is operated by cam $h^4$ on the reduced portion of the left-hand end of cam-shaft I when that shaft is rotated in a direction opposite to the arrow. When cam $h^4$ moves out of engagement with lever H', pinion H drops by gravity to break mesh with the gears referred to.

The cam-shaft I for shifting the gears is centrally mounted with respect to shafts A, B, and C in bearings formed in the end walls of the casing, and either or both ends of the shaft may project beyond the casing for connection with suitable means for imparting a rotary movement thereto, said means, it being understood, will be operated by any suitable form of speed-controlling mechanism on the vehicle. Extending horizontally with the cam-shaft I are two short rods J, carried by projections from the cover of the casing, and on which rods slide sleeves E' and G', from which project the shift-arms E and G respectively. These shifting-arms are provided with small rollers which work in the cam-grooves I' and I², respectively. In shifting the gears from rest to full speed the cam-shaft I is rotated in the direction of the arrow on that shaft, and it will be understood that in shifting from higher to lower speeds the shaft will be rotated in the opposite direction. No operating connection for rotating the cam-shaft is illustrated, since any suitable mechanism may be employed—such, for instance, as a rack and pinion connected with the usual operating lever or wheel.

The position of the parts as illustrated in the drawings indicate the position of rest, and in shifting to the various speeds the operation is as follows: In rotating the cam-shaft from the position of rest, which is marked position 1 on the diagram Fig. 4, to position 2, which is the starting position, the cam-shaft moves arm E to the left, whereby pinion 19ª is moved in the same direction and into mesh with gear-wheel 34ª. It will be observed that in the position of rest pinion 19ᵇ and gear-wheel 34ᵇ are in mesh and that in rotating the cam-shaft to the starting position arm G moves in the straight portion of cam-groove I², and hence these two gears remain in mesh. This operation establishes the low-speed driving connection as follows: from shaft A and pinion 19ª to gear-wheel 34ª and shaft C, and from shaft C through pinion 19ᵇ and gear-wheel 34ᵇ to shaft B. By continuing the rotation of the cam-shaft to position 3 arm G continues to travel in the straight portion of the cam-groove I², thus maintaining gears 19ᵇ and 34ᵇ in mesh, and arm E is moved back to the right by cam-groove I', thus shifting gears 19ª and 27 to the right to a position intermediate the gears 34ª and 26, (as in position 1,) thus breaking the driving connection, and by continuing the rotation of the cam-shaft to position 4 the gears controlled by arm G still remain in the same position, while arm E is moved farther to the right, thus placing gear-wheel 27 in mesh with pinion 26. This establishes the second-speed connection through shafts A, B, and C. By continuing the rotation of the cam-shaft to position 5 arm G is moved to the left, thus shifting sleeve c in the same direction and breaking mesh between pinion 19ᵇ and gear-wheel 34ᵇ, and at the same time arm E continues to travel to the right, carrying gears 19ª and 27 in the same direction, breaking mesh between gears 26 and 27, and bringing clutch F and F' into locking position. This establishes the third speed or direct driving connection between shafts A and B. It is evident that, if desired, the gears 19ᵇ and 34ᵇ may remain in mesh on the third speed, and there will then be no driving connection of the gearing, since only two gears will be in mesh. If now it is desired to travel at a still greater speed, cam-shaft I is farther rotated in the same direction to position 6. This movement causes arm G to travel farther to the left, placing gear-wheel 34ᶜ and pinion 19ᶜ into mesh, and at the same time arm E is moved to the left, opening clutch F and F' and again placing gears 26 and 27 into mesh. This again establishes a driving connection from the shaft A to shaft C and from shaft C to shaft B; but instead of the connection being such as to reduce the speed of shaft B relative to shaft A the speed of shaft B will be increased relative to the speed of shaft A. As an indication of the speeds obtained it may be pointed out that the reference-numerals 19, 26, 27, and 34 on the gears indicate their relative sizes or the number of teeth; but of course it will be understood that the relative sizes of the gears may be varied. To reduce speed, cam-shaft I is rotated in the opposite direction, and the gear connections above described will be established in the reverse order, and when the controlling lever or wheel which operates the cam-shaft is returned to the position of rest the cam-shaft and coöperating parts and the gears will again assume the positions shown in Figs. 1 and 3. The reversing-pinion H is operated only when the gears are in the position in Fig. 1—that is to say, if the vehicle is at rest and it is desired to go backward it is only necessary to raise pinion H into mesh with gears 19ª and 34ª by rotating cam-shaft I in the direction opposite to the arrow, which, as above explained, operates lever H' and frame h. When the vehicle is traveling in a forward direction, the cam-shaft is rotated backward past the position of rest until cam h⁴ engages lever H' to raise pinion H.

The employment of the two independently axially movable elements for securing the several geared speeds and the direct drive makes it possible to greatly reduce the dimensions of the gear-box, to reduce the cost of manufacture, to simplify the controlling mechanism, and to reduce the depreciation of the gears and other parts by the reduction of weight and the more desirable method of engaging the gears which this arrangement makes readily possible.

While I have described my improved change-speed gear as applicable to motor-cars, it is evident that said gearing may be equally as well applied to other vehicles or apparatus designed to be operated at two or more different speeds.

What I claim is—

1. In a variable-speed gear for motor-cars, the combination of three shafts whose axes are fixed relatively to each other and two of said shafts having their axes axially alined, means for coupling the two axially-alined shafts so that they will rotate at the same speed, a plurality of axially-movable elements each being adapted to effect two different power-transmitting connections, a plurality of axially-fixed elements, and means for axially moving said movable elements for obtaining three different geared forward drives.

2. In a variable-speed gear for motor-cars, the combination of coöperating shafts, a plurality of fixed elements, two independently axially movable elements, means for combining said elements so that each of said movable elements effects two different power-transmitting connections and including a direct drive, means coöperating with certain of said elements for obtaining a reverse drive, and a single manipulating means for obtaining all of the various combinations.

3. In a gearing mechanism for obtaining four forward progressive speeds, the combination of a driving-shaft, a driven shaft, said two shafts being arranged end to end, a third shaft parallel with the first two shafts, gears on said shafts whereby the driving-shaft may be geared to the driven shaft for either the lowest speed, second or fourth speeds, means for directly coupling said driving and driven shafts together for the third speed, and mechanism for imparting to the movable elements the desired movement and for holding said elements in position.

4. In a variable-speed gear for motor-cars, the combination of a plurality of shafts, two of said shafts being axially alined, gearing for obtaining a low-speed drive of the motor-car and a high-speed drive, said gearing connecting certain of said shafts, means for securing an intermediate speed by a direct drive between said axially-alined shafts, and means whereby the parts may be manipulated to secure a progressive increase in speed.

5. In a variable-speed gear, the combination of a driving-shaft, a driven shaft, said two shafts being arranged in alinement, a third shaft parallel with the first two shafts, gears on said shafts whereby the driving-shaft will be geared to the driven shaft for either low or high speed, means for directly coupling said driving and driven shafts together for an intermediate speed, mechanism for shifting the gears and coupling into and out of operative position for securing a progressive change in speed, and a reversing-gear adapted to mesh with a gear on the driving-shaft and a gear on the third shaft for reversing the direction of rotation.

6. In a four-speed change and reversing gear for motor-cars, two shafts, means for positively connecting said shafts for obtaining one forward speed of the car, a third shaft, gear-wheels arranged on certain of said shafts for obtaining three other speeds of the car, said gear-wheels comprising a plurality of axially-movable elements each being adapted to effect two different power-transmitting connections, means comprising a reversing-gear for connecting a pair of said gear-wheels, and a single manipulating device for shifting the movable elements.

7. In a change-speed gear for motor-cars, the combination of coöperating shafts, a plurality of axially-fixed elements, two independently axially movable elements, one of said movable elements comprising two gears and the other of said movable elements comprising means for effecting two different power-transmitting connections, means for combining said axially fixed and movable elements so as to obtain a plurality of geared forward speeds and a direct drive, and a single controlling device for obtaining said combinations.

8. In a motor-car change-gear, the combination of a driving and a driven shaft axially alined, means for coupling said shafts, a third shaft parallel to said alined shafts, gear-wheels comprising a movable pair of spur-gears on one of said shafts and another independently axially movable element, said element having means for effecting two different power-transmitting connections, means for connecting said gearing and shaft-coupling for obtaining two geared forward speeds of the ca and a direct drive, and means coöperatin, with said gears for obtaining a reverse rotation.

9. In a variable-speed gear, the combination with a driving-shaft having two gears, and a clutch member movable longitudinally thereon and adapted to rotate therewith, a driven shaft having a clutch member, two gears in a fixed position thereon, said two shafts being in alinement, a third shaft parallel thereto, two gears fixed at one end of said third shaft adapted to mesh respectively with the movable gears on the driving-shaft, two gears on the other end of said third shaft movable longitudinally thereon and adapted to rotate therewith, and arranged to mesh respectively with the gear on the driven shaft, mechanism for shifting said movable gears and clutch member into and out of operative position, and a reversing-gear adapted to mesh with a gear on the driving-shaft and the adjacent gear on the third shaft to reverse the direction of rotation thereof.

10. In a motor-car change-speed mechanism, three coöperating shafts whose axes are fixed and two of which are axially alined, a plurality of axially-fixed elements, a plurality of axially-movable elements each of said movable elements having means to effect two different power-transmitting connections, one of said movable elements effecting a direct connection of said alined shafts, means for combining said elements to operate the car at three different forward speeds, gearing mechanism coöperating with said elements for obtaining a reverse motion of the car, and a single manipulating device for obtaining the various combinations.

11. In a motor-car change-speed mechanism, three coöperating shafts whose axes are fixed and two of which are axially alined, driving means comprising a plurality of axially independently movable elements for connecting said shafts for giving four forward speeds of the car, each of said elements being adapted to effect two different power-transmitting connections, and a single controlling device for obtaining the various combinations.

12. In a motor-car change-speed mechanism, three coöperating shafts whose axes are fixed and two of which are axially alined, a plurality of gears upon certain of said shafts, a plurality of axially independently movable elements, each of said elements comprising two gears, a clutch device for connecting and disconnecting said alined shafts, means for combining said gears, elements and clutch device to operate the car at different forward speeds, and means engaging one of said gears for obtaining a reverse motion of the car.

13. In a motor-car change-speed mechanism, three coöperating shafts whose axes are fixed and two of which are axially alined, a plurality of axially-fixed elements including a clutch member, a plurality of axially independently movable elements, each of said movable elements being adapted to effect two different power-transmitting connections, one of said movable elements having a clutch member, means for combining said elements and clutch members to operate the car at four different forward speeds, one of said speeds being obtained by the direct connection of said alined shafts by said clutch members, and means for obtaining a reverse motion of the car coöperating therewith.

14. In a motor-car variable-speed mechanism, the combination of three shafts, whose axes are fixed and two of which are axially alined, and means comprising a plurality of axially independently movable elements for obtaining four forward speeds and a reverse motion of the car, one of said four speeds being secured by a direct connection of said alined shafts, and each of said elements being adapted to effect two different power-transmitting connections.

15. In a motor-car change-speed mechanism, the combination of three coöperating shafts whose axes are fixed and two of which are axially alined, and mechanism comprising a plurality of independently axially movable elements for coöperating with said shafts to secure four forward speeds and one reverse speed of the car, each of said elements being adapted to effect two different power-transmitting connections.

16. In a motor-car change-speed mechanism, three coöperating shafts whose axes are fixed and two of which are axially alined, means comprising axially-fixed spur-gears and two independently axially movable elements for obtaining two forward geared drives and a direct drive, each of said elements being adapted to effect two different power-transmitting connections, gearing coöperating with certain of said spur-gears for obtaining a reverse drive, and a single controlling device for obtaining the various combinations.

17. In a four-speed gear, two shafts arranged end for end, a clutch for connecting and disconnecting said shafts, a counter-shaft, gear-wheels movable on said counter-shaft on one side of the clutch, independently-movable gear-wheels on one of the first-named shafts located on the opposite side of said clutch, whereby one direct drive and three different-geared drives can be obtained, and mechanism for effecting the several connections.

18. In a four-speed gear, two shafts arranged end to end, a clutch for directly connecting and disconnecting said shafts, a counter-shaft parallel to said shafts, two gear-wheels of different size on one of the first-named shafts, two corresponding gear-wheels on the counter-shaft adapted to mesh therewith, two gear-wheels of different size on the other of the first-named two shafts, two corresponding gear-wheels on the counter-shaft adapted to mesh with the last-named two gear-wheels, and means for making and breaking mesh between the respective pairs of gear-wheels and for operating said clutch, whereby a direct drive and three different-geared drives can be obtained.

19. In a four-speed change and reversing gear, two shafts, means for positively connecting said shafts for one forward speed, a counter-shaft, gear-wheels arranged on said shafts movable relatively to each other for obtaining three other forward speeds, means comprising a movable reversing-pinion for connecting one pair of gear-wheels, and a single controlling device for shifting the movable elements.

20. In a change-speed gear, the combination of a driving and a driven shaft, means for connecting said shafts to operate at the same speed, a counter-shaft, gearing between said shafts whereby the driven shaft may be driven at two or more different speeds, and a single manipulating device and means controlled thereby for causing said gearing to rotate the driven shaft at one or more lower speeds than the driving-shaft, for coupling the said driving and driven shafts to operate at the same speed, and for causing said gearing to rotate the driven shaft at a higher speed than the driving-shaft and effect a progressive increase in speed.

21. In a motor-car variable-speed gear, the combination with gearing for obtaining low and high speeds, of a direct-coupling means for obtaining a speed between said low and high speeds and with no gears of said gearing in mesh.

22. In a motor-car variable-speed gear, the combination with spur-gearing for optaining low forward and reverse speeds and a higher forward speed, of a direct coupling means for obtaining a forward speed between said low higher speeds and with no gears of said gearing in mesh.

23. In a motor-car variable-speed gear, the combination with gearing for obtaining low forward and reverse speeds and a higher forward speed, of a direct coupling means for obtaining a speed between said low and higher speeds and with no gears of said gearing in mesh, and a single manipulating device for securing the various combinations.

24. In a motor-car change-speed mechanism, means for obtaining a direct drive, gearing for obtaining a higher and also a lower speed than that corresponding to the direct drive, and means whereby said parts may be connected to obtain a progressive increase in speed.

25. In a motor-car change-speed mechanism, a driving-shaft, a shaft axially alined therewith, clutch mechanism for connecting said shafts to rotate at the same speed, a third shaft parallel to said alined shafts, spur-gearing on certain of said shafts for obtaining a higher and a lower speed of the car than that obtained by use of said clutch mechanism, and means whereby said parts may be connected to obtain a progressive increase in speed.

26. In a motor-car change-speed mechanism, a driving-shaft, a shaft axially alined therewith, clutch mechanism for connecting said shafts to rotate at the same speed, a third shaft parallel to said alined shafts, spur-gearing on certain of said shafts for obtaining lower forward and reverse speeds of the car than that obtained by use of said clutch mechanism and for obtaining a higher forward speed of the car than that obtained by said clutch mechanism, and a single manipulating device for obtaining all the various combinations and securing a progressive increase in speed.

27. In a change-speed mechanism, the combination of a driving-shaft, a driven shaft axially alined therewith, clutch mechanism for connecting said shaft to rotate at the same speed, a single counter-shaft parallel to said alined shafts, the axes of which shafts are fixed relatively to each other, spur-gearing on certain of said shafts for obtaining two or more forward speeds and arranged to be in operative driving connection only when said clutch is open, a certain element on one of the alined shafts and a certain element on the counter-shaft being axially movable for obtaining the several driving connections, each of said elements being adapted to effect two different power-transmitting connections, and means for shifting said movable elements.

28. In a change-speed mechanism, the combination of a driving-shaft, a driven shaft axially alined therewith, clutch members for connecting said shafts to rotate at the same speed, a single counter-shaft parallel to said alined shafts, the axes of which shafts are fixed relatively to each other, spur-gearing on certain of said shafts for obtaining two or more forward speeds and arranged to be in operative connection only when said clutch members are open, there being an axially-movable element on one of the alined shafts and a second axially-movable element on the counter-shaft for obtaining the several driving connections, each of said elements being adapted to effect two different power-transmitting connections, means for moving the parts for obtaining the different driving connections, and a single actuating device for said means.

29. In a change-speed mechanism, the combination of a driving-shaft, a driven shaft, axially alined therewith, clutch members for connecting said shafts to rotate at the same speed, a third shaft parallel to said alined shafts, the axes of which shafts are fixed relatively to each other, spur-gearing on said shafts for obtaining two or more forward speeds and arranged to be in operative driving connection only when said clutch members are open there being a certain element on one of the alined shafts and a certain element on the counter-shaft axially movable for obtaining the several driving connections, each of said elements being adapted to effect two different power-transmitting connections, coöperating means comprising a spur-gear for obtaining a reverse drive, and means for shifting the parts for obtaining the various combinations.

30. In a change-speed mechanism, the combination of a driving-shaft, a driven shaft axially alined therewith, clutch members for connecting said shaft to rotate at the same speed, a counter-shaft parallel to said alined shafts, the axes of which shafts are fixed relatively to each other, spur-gearing on said shafts for obtaining two or more forward speeds and arranged to be in operative driving connection only when said clutch is open, there being an element on one of the alined shafts and an element on the counter-shaft axially movable for obtaining the several driving connections, each of said elements being adapted to effect two different driving connections, means for moving the movable parts, a single actuating device for said means, and coöperating means comprising a spur-gear arranged to connect the axially-alined shafts for obtaining a reverse drive.

31. In a change-speed mechanism for motor-cars, the combination of a driving-shaft, a shaft axially alined therewith, clutch members for connecting said shafts to rotate at the same speed, a counter-shaft parallel to said alined shafts, the axes of which shafts are fixed relatively to each other, spur-gearing on said shafts for obtaining two or more forward speeds, there being an element on one of the alined shafts and an element on the counter-shaft axially movable, each of said elements being adapted to effect two different power-transmitting connections, coöperating means comprising a spur-gear arranged to engage a gear on said driving-shaft for obtaining a reverse drive, and a single actuating device and means controlled thereby for shifting the parts to obtain the various combinations.

32. In a change-speed gearing, the combination of a driving-shaft, a driven shaft axially alined therewith, clutch members for connecting said shafts to operate at the same speed, a counter-shaft parallel to said alined shafts, the axes of said shafts being fixed relatively to each other, spur-gearing for obtaining three forward speeds, there being two axially-movable elements arranged to make and break the driving connection, each of said elements being adapted to effect two different power-transmitting connections, means for moving the axially-movable parts so that no gears on said counter-shafts are engaged when the clutch members are closed, and coöperating means comprising a spur-gear for obtaining a reverse drive, said gear being in engagement with a gear on said driving-shaft when in operation.

33. In a change-speed mechanism, the combination of a driving-shaft, a driven shaft axially alined therewith, clutch members for connecting said shafts to rotate at the same speed, a single counter-shaft parallel to said alined shafts, the axes of which shafts are fixed relatively to each other, spur-gearing on certain of said shafts for obtaining two forward speeds, there being two axially-movable elements for obtaining the several speeds, each of said elements being adapted to effect two different power-transmitting connections, means for shifting the movable parts so that no gears on said counter-shaft are engaged when the clutch members are closed, and a spur-gear for obtaining a reverse drive, said gear being in engagement with a gear on said driving-shaft when in operation.

34. In a change-speed gear, the combination of a driving-shaft, a driven shaft axially alined therewith, clutch members for connecting said shafts to rotate at the same speed, a counter-shaft parallel to said alined shafts, the axes of said shafts being fixed relatively to each other, spur-gearing on certain of said shafts for obtaining three forward-geared speeds, there being a plurality of axially-movable elements, each of said elements being adapted to effect two different power-transmitting connections, mechanism for effecting the several connections so that the gear on the driven shaft is driven by said gearing only when said clutch is open, and coöperating means comprising a spur-gear for obtaining a reverse drive, said gear being in engagement with a gear on said driving-shaft when in operation.

35. In a change-speed gear for motor-cars, the combination of a driving-shaft, a driven shaft axially alined therewith, clutch members for connecting said shafts to rotate at the same speed, a counter-shaft parallel to said alined shafts, the axes of said shafts being fixed relatively to each other, spur-gearing on certain of said shafts for obtaining a plurality of forward speeds and arranged to be in operative driving connection only when said clutch members are open, there being a plurality of independently axially movable elements arranged to make or break the driving connection, at least two of said elements being adapted to effect two different power-transmitting connections, coöperating means comprising a spur-gear for obtaining a reverse drive, said gear being in engagement with a gear on said driving-shaft when in operation, means for controlling the movable elements and for placing said reverse-gear in engagement with the driving-gear, and a single actuating device for said means.

36. In a four-speed gear, two shafts arranged end to end, a clutch for connecting and disconnecting said shafts, a counter-shaft, gear-wheels movable upon said counter-shaft on one side of the clutch, independently-movable gear-wheels on one of the first-named shafts located on the opposite side of said clutch, whereby one direct drive and three different-geared drives can be obtained, a spur-gear for obtaining a reverse drive meshing with two of said gear-wheels when in operation, and mechanism for effecting the several connections.

37. In a motor-vehicle change-speed gear, the combination of two shafts, means for positively connecting said shafts for one forward speed, a counter-shaft, gear-wheels arranged on certain of said shafts for obtaining three other forward speeds, there being movable elements on more than one of said shafts, a movable reversing spur-gear for connecting one pair of said gear-wheels, and a single controlling device for shifting the movable elements.

38. In a four-speed change and reversing gear for motor-vehicles, a driving-shaft, a driven shaft, means for positively connecting said shafts for one forward speed, a counter-shaft, gear-wheels arranged on certain of said shafts for obtaining three other forward speeds, there being a plurality of independently axially movable elements, at least two of said elements being adapted to effect two different power-transmitting connections, a reversing spur-gear meshing with a gear-wheel on the driving-shaft and a gear-wheel on the counter-shaft when in operation, and a single controlling device for shifting the movable elements.

39. In a motor-car four-speed gearing, a driving-shaft and a driven shaft arranged end to end, a clutch for connecting and disconnecting said shafts, a counter-shaft, gear-wheels on certain of said shafts whereby one direct drive and three different-geared drives can be obtained, there being a plurality of axially-movable elements, at least two of said elements being each adapted to effect two different power-transmitting connections, mechanism for effecting the several connections so that the gear on the driven shaft is driven by said gearing only when said clutch is open, and a single actuating device for operating said mechanism.

40. In a motor-car four-speed gearing, a driving-shaft and a driven shaft arranged end to end, a clutch for connecting and disconnecting said shafts, a counter-shaft, gear-wheels on certain of said shafts, there being a plurality of independently axially movable elements, two of said elements being each adapted to effect two different power-transmitting connections, whereby one direct drive and three different-geared drives can be obtained, mechanism for effecting the several connections so that the gear on the driven shaft is driven by said gear-wheels only when said clutch is open, and a single actuating device for operating said mechanism to give a gradually-increasing speed of the car by a progressive movement of said device in one direction.

41. In a motor-car change-speed gear, the combination of coöperating shafts, gearing thereon comprising an axially-movable element for obtaining the first, second, and third speeds, and a second independently axially movable element for obtaining the fourth speed, and a single manipulating device for obtaining the various connections.

42. In a motor-car change-speed gear, the combination of coöperating shafts and gearing thereon, comprising an axially-movable element for obtaining the first, second, and third speed, a second independently axially movable element for obtaining the fourth speed, means coöperating with said gearing whereby a reverse movement of the car is obtained, and a single manipulating device for obtaining the various connections.

43. In a motor-car change-speed gear, the combination of coöperating shafts, and gearing thereon comprising an axially-movable element for obtaining the first, second, and third speeds, a second independently axially movable element for obtaining the fourth speed, means coöperating with the same gears as are used for obtaining the first speed for producing a reversed rotation of the driven shaft, and a single manipulating device for obtaining the various connections.

44. In a motor-car change-speed gear, the combination of eight spur-gears and means for combining them to obtain three different speeds of the driven shaft each in the same direction and each different from the speed of the driving-shaft, there being two independently axially movable elements, each of said elements being adapted to effect two different power-transmitting connections, and means coöperating with four of the eight spur-gears for obtaining a reversed rotation of the driven shaft.

45. In a motor-car change-speed gear, the combination of eight spur-gears and means for combining them to obtain three different speeds of the driven shaft each in the same direction and each different from the speed of the driving-shaft, means coöperating with four of the said eight spur-gears for obtaining a reverse rotation of the driven shaft, and means for operating the driven shaft in the same direction and at the same speed as the driving-shaft, there being two independently axially movable elements, each of said elements being adapted to effect two different power-transmitting connections.

46. In a motor-car change-speed gear, the combination of spur-gears, a clutch device, means for moving three elements thereof for obtaining three forward speeds of the driven shaft, each different from the speed of the driving-shaft, the same speed of the driven shaft as that of the driving-shaft, and a reversed speed, two of said elements being axially movable and each being adapted to effect two different power-transmitting connections.

47. In a motor-car change-speed gear, the combination of spur-gears, a clutch device, means for moving at least three elements thereof for obtaining three forward speeds of the driven shaft each different from the speed of the driving-shaft, the same speed of the driven shaft as that of the driving-shaft, and a reversed speed, two of said elements each being adapted to effect two different power-transmitting connections, and a single controlling device for obtaining the various connections.

48. In a motor-car change-speed gear, the combination of coöperating shafts two of which are axially alined, gear-wheels and a clutch device comprising two independently axially movable elements by the movement of which four different forward speeds are obtained, three of which speeds employ gear-wheels and the fourth speed employing a direct drive between said alined shafts, each of said elements being adapted to effect two different power-transmitting connections, and means coöperating with the gears used for one forward drive to secure a reverse drive.

49. In a motor-car change-speed gear, the combination of coöperating shafts two of which are axially alined, gear-wheels and a clutch device comprising two independently axially movable elements by the movement of which four different forward speeds are obtained, three of which speeds employ gear-wheels and the fourth speed employs a direct drive between said alined shafts, each of said elements being adapted to effect two different power-transmitting connections, means coöperating with the gears used for one forward drive to secure a reverse drive, and a single controlling device for obtaining the various combinations.

50. In a motor-car change-speed gear, the combination of two axially-alined shafts and a third shaft, power-transmitting means on said shafts comprising two axially-movable elements and a third movable element, each of said movable elements comprising a gear-wheel, and by the movement of which three different forward speeds and one reverse speed are obtained, one of said forward speeds being a direct drive between said alined shafts, and means for positively moving each of said two elements in both directions and so that no power-transmitting means on said third shaft is engaged when the direct drive is secured.

51. In a motor-car change-gear, the combination of a plurality of coöperating shafts, two of said shafts being axially alined, two independently axially-movable elements, and a third movable element, by the movement of which three different forward speeds and one reverse are obtained, one of said forward speeds being a direct drive between said alined shafts, and the reverse speed being obtained by the engagement of said third element with the driving-gear, and a single controlling means for obtaining the said forward speeds and reverse.

52. In a motor-car change-speed gear, the combination of a plurality of coöperating shafts, two of said shafts being axially alined, two independently axially movable elements, means whereby said elements are moved manually in both directions, and a third movable element, the movement of said elements giving four different forward speeds and one reverse speed, one of said forward speeds being a direct drive between said alined shafts, and the reverse speed being obtained by the engagement of said third element with the driving-gear.

53. In a motor-car change-gear, the combination of a plurality of coöperating shafts, two of said shafts being axially alined, two independently axially-movable elements, and a third movable element, by the movement of which four different forward speeds and one reverse are obtained, one of said forward speeds being a direct drive between said alined shafts, and the reverse speed being obtained by the engagement of said third element with the driving-gear, and a single controlling device for obtaining the said forward speeds and reverse.

54. In a motor-car change-gear, the combination of three shafts, two of said shafts being axially alined, one or more spur-gears on certain of said shafts, there being two independently axially movable elements, each of said elements being adapted to effect two different power-transmitting connections, and a single controlling means for combining the gears and coupling the alined shafts for producing three geared forward speeds and a reverse drive.

55. In a motor-car change-gear, the combination of shafts and gears thereon for obtaining three forward geared speeds and a direct drive, the said shafts having fixed axes, there being two axially-movable elements, means whereby said elements are moved manually in both directions, and means coöperating therewith for obtaining a reverse movement of the car.

56. In a motor-car change-gear, two axially-alined shafts, a third shaft whose axis is fixed relatively to said two shafts, a plurality of axially-fixed elements upon certain of said shafts and a plurality of axially-movable elements for obtaining a plurality of different-geared forward speeds of the third shaft and a direct drive between the axially-alined shafts, at least two of said axially-movable elements each being adapted to effect two different power-transmitting connections, means whereby said two elements are moved axially in both directions manually, and means coöperating therewith for obtaining a reverse movement of the car.

57. In a motor-car change-gear, two axially-alined shafts, a third shaft whose axis is fixed relatively to said two shafts, a plurality of spur gear-wheels axially fixed upon certain of said shafts, a plurality of axially-movable elements each adapted to effect two different power-transmitting connections, means for engaging said axially-movable elements with corresponding fixed elements, a clutch device for directly connecting said axially-alined shafts, whereby three different-geared forward speeds and a direct drive are obtained, and means coöperating with certain of said gears for obtaining a reverse drive.

58. In a motor-car change-gear, the combination of coöperating shafts, a plurality of fixed elements, two independently axially movable elements, each of said movable elements being adapted to effect two different power-transmitting connections, and means for combining said elements so as to obtain a plurality of geared speeds and a direct drive.

59. In a motor-car change-gear, the combination of coöperating shafts, a plurality of fixed elements, two independently axially movable elements, each of said movable elements being adapted to effect two different power-transmitting connections, means for uniting said elements so as to obtain a plurality of geared speeds and a direct drive, and a single controlling device for obtaining the various combinations.

60. In a motor-car change-gear, the combination of coöperating shafts, a plurality of fixed gears, two independently axially movable elements, each movable element comprising two gears, and means for combining said gears and movable elements so as to obtain a plurality of geared speeds and a direct drive.

61. In a motor-car change-gear, the combination of coöperating shafts, a plurality of fixed gears, two independently axially movable elements, each movable element comprising two gear-wheels, means for combining said gears and movable elements so as to obtain a plurality of geared speeds and a direct drive, and a single controlling device for obtaining said combinations.

62. In a motor-car change-gear, the combination of coöperating shafts, a plurality of fixed gears, two independently axially movable elements, each movable element comprising two gears, means for combining said gears and movable elements so as to obtain a plurality of geared speeds and a direct drive, and means in combination with certain of said gears for obtaining a reverse drive.

63. In a motor-car change-speed gear, the combination of coöperating shafts, a plurality of fixed gears, two independently axially movable elements, each movable element comprising two gears, means for combining said gears and movable elements so as to obtain a plurality of geared speeds and a direct drive, means in combination with certain of said gears for obtaining a reverse drive, and a single controlling device for obtaining all of the various combinations.

64. In a motor-car change-gear, the combination of coöperating shafts, and gear-wheels comprising a single axially-movable element for obtaining two forward speeds and a direct drive and a second axially-movable element for obtaining a different speed.

65. In a motor-car change-gear, the combination of two axially-alined shafts, a third shaft parallel thereto and whose axis is fixed relatively to the two alined shafts, four gears on the third shaft, gears on the alined shafts, two of the gears on the alined shafts being rigidly connected and axially movable, a second movable element adapted to give two different speeds, a clutch device for rigidly connecting the alined shafts, means for engaging the various gears and the clutch for obtaining three forward speeds and a direct drive, means coöperating with certain of said gears for obtaining a reverse drive, and a single manipulating device for obtaining all of the various combinations.

66. In a motor-car change-gear, the combination of two axially-alined shafts, a third shaft parallel thereto and whose axis is fixed relatively to the two alined shafts, four gears on the third shaft, gears on the alined shafts, two of the gears on the alined shaft being rigidly connected and axially movable, a second movable element adapted to give two different speeds, a clutch device for rigidly connecting the two alined shafts, means for engaging the various gears and the clutch for obtaining three forward speeds and a direct drive, and means coöperating with certain of said gears for obtaining a reverse drive.

67. In a motor-car change-gear, the combination of a driving and a driven shaft axially alined, means for coupling said shafts, a third shaft parallel with said alined shafts, gear-wheels comprising a movable pair of spur-gears on one of said alined shafts and another axially-movable element, said element being adapted to give two different speeds, means for connecting the said gearing and coupling for obtaining two forward speeds and a direct drive, and means introduced between the driving-shaft and said third shaft for obtaining a reverse rotation of the driven shaft.

68. In a motor-car change-gear, two shafts axially alined, a counter-shaft whose axis is fixed relatively to said alined shafts, gears on the alined shafts and on the counter-shaft and means for coupling the two alined shafts so as to operate at the same speed, there being two axially-movable elements, each of said elements being adapted to effect more than one power-transmitting connection, and means for operatively connecting the parts for obtaining a plurality of forward speeds.

69. In a motor-car change-gear, two shafts axially alined, a counter-shaft whose axis is fixed relatively to said alined shafts, gears on the alined shafts and on the counter-shaft, means for coupling the two alined shafts so as to operate at the same speed, there being two axially-movable elements, each of said elements being adapted to effect more than one power-transmitting connection, and a single operating device for operatively connecting the parts for obtaining a plurality of forward speeds.

70. In a motor-car change-gear, three shafts whose axes are fixed relatively to each other and two of which have their axes in alinement, a plurality of axially independently movable elements, one of said elements comprising a spur-gear and a clutch device and the other movable element comprising two gears, coöperating spur-gears on certain of said shafts, means for operatively employing said movable elements for obtaining two forward geared speeds of the car and a direct drive between said alined shafts, means coöperating with certain of said gears for obtaining a reverse speed, and a single controlling device for obtaining said various combinations.

71. In a motor-car change-gear, the combination of two axially-alined shafts, means for coupling said shafts to rotate at the same speed, a third shaft whose axis is fixed relatively thereto, spur-gears on said third shaft, two independently-movable elements, each of said elements comprising two spur gear-wheels, and means for operatively connecting each of said elements so that one of said spur gear-wheels on one element is out of mesh when the other spur gear-wheel on the same element is in mesh.

72. In a motor-car change-gear, the combination of two axially-alined shafts, means for coupling them to rotate at the same speed, a third shaft whose axis is fixed relatively thereto, four spur-gears on said third shaft, a plurality of spur-gears on said axially-alined shafts, means for axially and independently moving at least two of said spur-gears for obtaining three forward geared speeds, means comprising a spur-gear coöperating therewith for obtaining a reverse speed, and a single controlling device for obtaining the various combinations.

This specification signed and witnessed this 3d day of September, 1902.

H. WARD LEONARD.

Witnesses:
 HARRY F. DAVIDSON,
 WALTER H. MOTT.